United States Patent
Platt et al.

(10) Patent No.: US 9,857,484 B2
(45) Date of Patent: Jan. 2, 2018

(54) METHOD AND APPARATUS FOR NEUTRON DETECTION

(75) Inventors: Simon Philip Platt, Preston (GB); Xiao Xiao Cai, Preston (GB)

(73) Assignee: THE SCIENCE AND TECHNOLOGY FACILITIES COUNCIL, Swindon (GB)

( * ) Notice: Subject to any disclaimer, the term of this patent is extended or adjusted under 35 U.S.C. 154(b) by 125 days.

(21) Appl. No.: 14/233,677

(22) PCT Filed: Jul. 20, 2012

(86) PCT No.: PCT/GB2012/051739
§ 371 (c)(1),
(2), (4) Date: Jan. 17, 2014

(87) PCT Pub. No.: WO2013/011325
PCT Pub. Date: Jan. 24, 2013

(65) Prior Publication Data
US 2014/0158893 A1 Jun. 12, 2014

(30) Foreign Application Priority Data
Jul. 20, 2011 (GB) .................... 1112457.5

(51) Int. Cl.
*G01T 3/08* (2006.01)
*G01T 3/00* (2006.01)

(52) U.S. Cl.
CPC .............. *G01T 3/085* (2013.01); *G01T 3/003* (2013.01); *G01T 3/08* (2013.01)

(58) Field of Classification Search
CPC ......... G01T 3/085; G01T 3/001; G01T 3/003; G01T 3/08; G01T 3/00
(Continued)

(56) References Cited

U.S. PATENT DOCUMENTS

| 6,349,124 B1 | 2/2002 | Kronenberg et al. |
| 6,678,343 B1 | 1/2004 | Kronenberg et al. |

(Continued)

FOREIGN PATENT DOCUMENTS

| GB | 2474720 A | 4/2011 |
| JP | S50-25831 B | 8/1975 |

(Continued)

OTHER PUBLICATIONS

United Kingdom Intellectual Property Office, "Patents Act 1977: Search Report under Section 17(5)," dated Nov. 21, 2011, 5 pages.
United Kingdom Intellectual Property Office, "Patents Act 1977: Search Report under Section 17(6)," dated Mar. 1, 2012, 3 pages.
International Searching Authority, "International Search Report and Written Opinion of the International Searching Authority," dated Feb. 5, 2013, 11 pages.

(Continued)

*Primary Examiner* — David Porta
*Assistant Examiner* — Carolyn Igyarto
(74) *Attorney, Agent, or Firm* — Barnes & Thornburg LLP

(57) ABSTRACT

Embodiments of the present invention provide a neutron spectrometry system, comprising a plurality of semiconductor detector portions arranged in close proximity, wherein the detector portions are arranged in at least two non-parallel axes, wherein each detector portion is arranged to output a detection signal indicative of energy deposited in the detector portion by ionising particles induced in the device by incident neutrons, and a control unit arranged to receive the plurality of detection signals, and to allocate detection signals to one or more of a plurality of channels based on a number of substantially coincident detection signals for determining a spectrum of incident neutrons based thereon.

19 Claims, 5 Drawing Sheets

(58) Field of Classification Search
USPC .................. 250/370.05, 390.01, 390.07, 391
See application file for complete search history.

(56) References Cited

U.S. PATENT DOCUMENTS

| | | |
|---|---|---|
| 6,841,841 B1 | 1/2005 | Blish, II et al. |
| 7,745,800 B1 | 6/2010 | McGinnis |
| 2001/0052572 A1 | 12/2001 | Mikami et al. |
| 2004/0061047 A1 | 4/2004 | Bolozdynua et al. |

FOREIGN PATENT DOCUMENTS

| | | |
|---|---|---|
| JP | S62-121382 A | 6/1987 |
| JP | H01-314988 A | 12/1989 |
| JP | H02-82439 A | 3/1990 |
| JP | H05-209967 A | 8/1993 |
| JP | 2001004755 A | 1/2001 |
| JP | 2005-513486 A | 5/2005 |
| WO | 1996027806 A1 | 9/1996 |
| WO | 2007109535 A2 | 9/2007 |
| WO | 2011022663 A1 | 2/2011 |

OTHER PUBLICATIONS

Barelaud et al., "Study of an Integrated Electronic Monitor for Neutron Fields," Radiation Protection Dosimetry, 1995, pp. 153-158, vol. 61, No. 1-3, Nuclear Technology Publishing.

Cinausero et al., "A Proton Recoil Telescope for Neutron Spectroscopy," Journal of Physics: Conference Series 41, 2006, pp. 219-224, vol. 41, Institute of Physics Publishing.

Hawkes et al., "The Design of a Proton Recoil Telescope for 14 MeV Neutron Spectroscopy," Sep. 2000, 8 pages.

Luszik-Bhadra et al., "Characterisation of Mixed Neutron-Photon Workplace Fields at Nuclear Facilities by Spectrometry (Energy and Direction) Within the EVIDOS Project," Radiation Protection Dosimetry, Sep. 23, 2007, pp. 219-229, vol. 124, No. 3.

Ndoye et al., "Neutron Radiation of an Electronic Sensor Using Coincidence Method for an Active Dosimeter," Nuclear Instruments & Methods in Physics Research A, 1999, pp. 414-420, vol. 423.

Roy et al., "A Proton-Recoil Spectrometer Using Solid-State Detectors and Particle Identification," Nuclear Instruments & Methods, 1970, pp. 1-6, vol. 87.

English translation of Japanese Office Action dated Feb. 19, 2016 for Japanese Application No. 2014-520731 (Includes Japanese language version), 7 pages.

METHOD AND APPARATUS FOR NEUTRON DETECTION

CROSS-REFERENCE TO RELATED APPLICATIONS

This application is a U.S. national counterpart application of International Application Serial No. PCT/GB2012/051739, filed Jul. 20, 2012, which claims priority to Great Britain Patent Application No. 1112457.5, filed Jul. 20, 2011. The entire disclosures of both of the foregoing applications are hereby incorporated by reference.

BACKGROUND

Neutrons are neutral particles which are not directly detectable electronically. Spectral information of neutron fields is often desired to be characterised, such as by surveying the neutron radiation environment at flight altitudes or in nuclear facilities. To measure a neutron spectrum Bonner sphere spectrometers are often used. A Bonner sphere spectrometer (BSS) comprises a plurality of spherical detectors, often six to fourteen, each of which includes a thermal neutron detector surrounded by a moderator of various thicknesses. The thickness of the moderator provides each detector with a different response function to neutron energy. A thicker moderator provides the detector with an increased response to higher energy neutrons but a reduced response to lower energy neutrons. After being exposed to a neutron field, readings of the spheres are used in an unfolding process to retrieve neutron spectrum information. However, BSSs are large and heavy, which restricts their usage in many applications.

It is an object of embodiments of the invention to provide a neutron detector and spectrometry system which is physically small and from which neutron spectrum information may be derived.

It is an object of embodiments of the invention to at least mitigate one or more of the problems of the prior art.

SUMMARY OF THE INVENTION

According to aspects of the present invention there is provided methods and apparatus as set forth in the appended claims.

According to a further aspect of the invention there is provided a neutron detector for neutron spectrometry, comprising a plurality of semiconductor detector portions arranged in close proximity, wherein the detectors are arranged in at least two non-parallel axes; and wherein each detector portion is arranged to output a detection signal responsive to energy deposited in the detector portion by ionising particles.

According to a further aspect of the present invention there is provided a neutron spectrometry system, comprising a plurality of semiconductor devices, each semiconductor device arranged to output a detection signal indicative of energy deposited in the device by ionising particles induced in the device by incident neutrons; and a control unit arranged to receive the plurality of detection signals, and to allocate detection signals to one or more of a plurality of channels based on a number of substantially coincident detection signals, such that a spectrum of incident neutrons may be determined there-from.

According to a further aspect of the present invention there is provided a method of determining a neutron spectrum, comprising receiving detection signals from a plurality of semiconductor detectors in response to neutron-induced ionising particles depositing energy in the semiconductor detectors; determining a channel allocation of the detection signals based on a number of substantially coincident detection signals; and determining an energy spectrum of the neutrons based upon the channel allocations.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
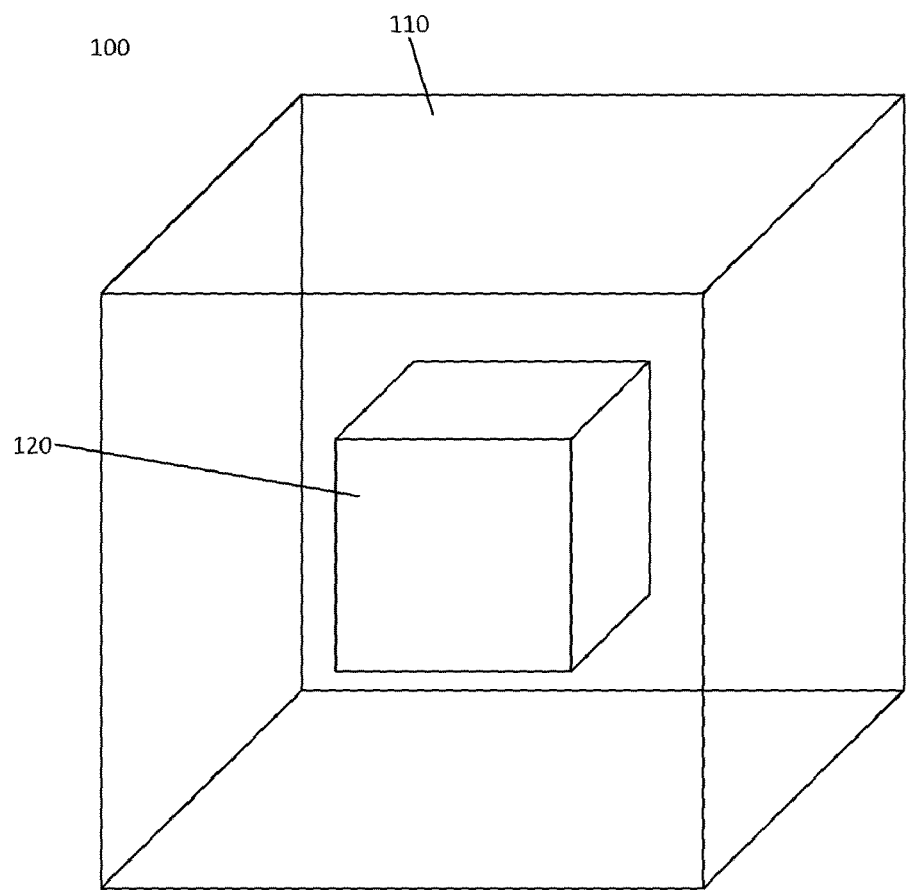
FIG. 1 shows a neutron detector according to a first embodiment of the invention.

FIG. 1 illustrates a neutron detector 100 according to a first embodiment of the invention. The neutron detector 100 is suitable for neutron spectrometry wherein an energy spectrum is determined of a neutron field to which the detector 100 is exposed. In particular, the detector 100 is suitable for determining the spectrum of a neutron field. The neutron field may include a fast neutron component, wherein the fast neutron component has an energy above 1 MeV.

Figure 2:
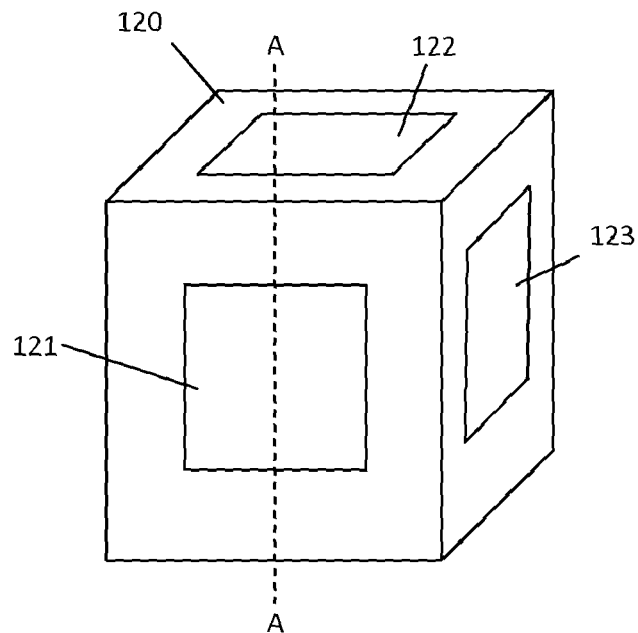
FIG. 2 shows a perspective view of a semiconductor neutron detector according to the first embodiment of the invention.
Figure 3:
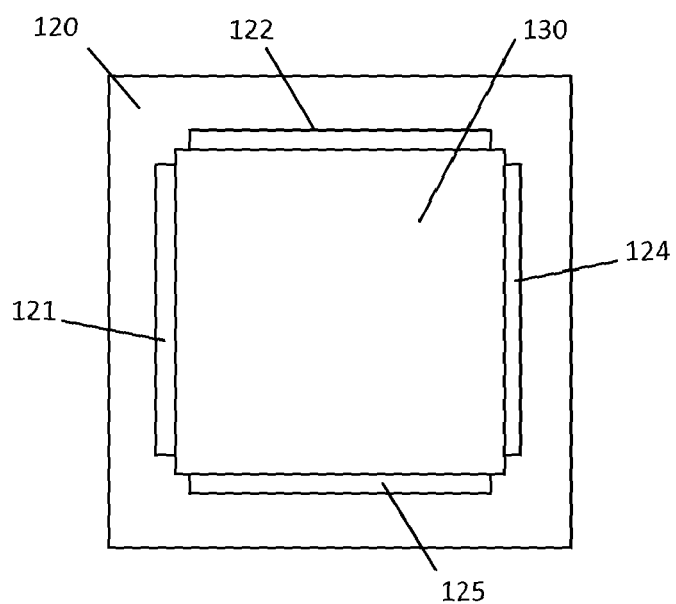
FIG. 3 shows a cross-section through the of a semiconductor neutron detector according to the first embodiment of the invention.
Figure 4:
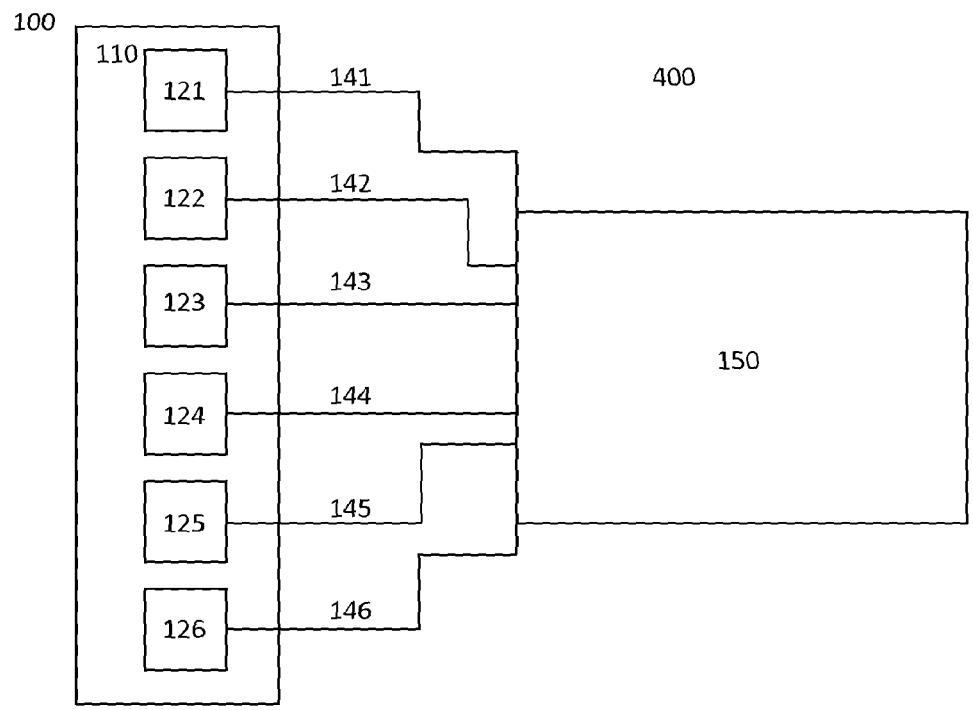
FIG. 4 shows a schematic of a neutron spectrometry system according to an embodiment of the invention.

FIG. 1 is an illustration of the detector 100, whilst FIGS. 2 and 3 only illustrate a semiconductor portion 120 of the detector 100. FIG. 3 is a cross-section along line A-A of the semiconductor portion shown in FIG. 2. It will be appreciated that the Figures are not drawn to scale. FIG. 4 is a schematic illustration of a system according to an embodiment of the invention.

The neutron detector 100 comprises a convertor 110 which is arranged to encase a semiconductor based detector 120. In the embodiments shown in FIG. 1, the convertor 110 material is cuboid shaped, although other shapes are envisaged, as discussed below. In particular, the cuboid may be cube-shaped, as shown in FIG. 1, although other cuboid shapes may be used. The convertor 110 may be shaped to have a corresponding shape as the detector 120 encased therein.

The convertor 110 is provided to convert neutrons to ionising particles, particularly energising light particles such as protons, alpha particles and other heavier particles, such as those resulting from spallation interactions e.g. tritons, deuterons, $^3$He which may interact with the semiconductor portion of the detector 100 to deposit energy therein, as will be explained. The convertor may be formed from one or more convertor materials. In example results given below, the converter material is aluminium. Other suitable materials include metals, transition metals, non-metals, heavy metals and hydrogenous materials. Metals which are particularly envisaged include copper and titanium. However, embodiments of the invention may also be envisaged which do not include a convertor 110. In these embodiments, incident neutrons are converted to ionising particles by a material of the semiconductor detector 120 i.e. through interaction with a body or substrate of the detector. Conversion may also occur in some embodiments from interaction of neutrons with a material contained in an enclosure volume 130 of the detector.

The semiconductor detector 120 is formed by a plurality of semiconductor devices capable of outputting an electronic signal responsive to energy deposition within one or more sensitive regions of the detector 120. The semiconductor detector 120 comprises a plurality of detector portions each including a sensitive region i.e. a region within which the passage of an ionising particle causes ionisation which results in a corresponding electrical signal being output from the respective sensitive region. The detector 120 illustrated in FIGS. 1-4 comprises six detector portions 121-126, although other numbers of detector portions 121-126 may be envisaged, as will be explained.

The detector 120 may be based on one of a plurality of types of semiconductor device. Embodiments of the invention will be explained with reference to a diode-based detector 120. Other types of detector may be envisaged, such as pixilated or strip detectors. The detector 120 includes a plurality of diodes, each having a sensitive region. At least one diode is arranged in a respective face of the detector 120. As shown in FIGS. 1-3, a first diode 121 is arranged in a first face of the detector 120, a second diode 122 is arranged in a second face of the detector, a third diode 123 is arranged in a third face of the detector etc., although not all diodes are shown in the Figures. The sensitive region of each detector portion 121-126 is preferably arranged on an interior face of the detector 120 i.e. facing the enclosure volume 130. Advantageously, this allows the closest arrangement of the sensitive regions of the detector 120 which enhances the detector's ability to detect all particles resulting from interactions of neutrons particular with the material of the detector 120. As will be explained, this enables better characterisation of the neutron field to which the detector 120 is exposed.

It will be appreciated that a detailed construction of each detector portion 121-126 is not shown in the Figures. For example, the sensitive region of each detector portion is expected to be located a distance from a surface of the detector 120. In some embodiments, the sensitive region of the detector is arranged between the electrical contacts and is located at around 50 μm below the surface of the detector 120. Each diode 121 . . . 126 may have an area of around 0.25 cm$^2$, although it will be realised that this is merely exemplary. On a top of each sensitive region an upper contact layer may be located, which may be formed of a metal such as gold. The use of diodes with a thick sensitive region leads to greater responsiveness; thinner diodes leads to improved to energy resolution. Suitable sensitive region depths are likely to be in the region from 10 μm to 500 μm. In example results presented below the sensitive region depth was 50 μm.

In embodiments of the invention the detector 120 is formed from detector portions 121-126 having sensitive volumes arranged in at least two axes or orientations. For example detector portions 121, 122 are arranged in axes which intersect at an angle of substantially 90°. Similarly, a second embodiment of the invention is shaped as a tetrahedron, as will be explained, wherein detector portions are arranged in axes which intersect at around 70°. Other shaped embodiments are also envisaged. The orientation of each detector portion 121-126 may be defined by a normal vector of a substrate of the detector portion 121-126 or of a surface of the sensitive region. Embodiments of the invention include non-parallel arrangements of detectors. In other words, where the normal vectors of each detector portion 121-126 intersect. The arrangement of detectors in at least two orientations improves a likelihood of the detector 120 distinguishing between as many ionising particles resulting from an interaction of a neutron as possible. For example some interactions, such as spallation reactions, lead to the production of multiple secondary particles.

The semiconductor detector 120 includes, in some embodiments, an enclosure volume 130. The enclosure volume 130 is at least partially enclosed by the detector portions 121-126. The enclosure volume 130 may be a void i.e. a vacuum, or may be filled with a gaseous or solid material, such as air, helium-3 or a scintillation material. In some embodiments, the material of the enclosure volume may be capable of neutron capture to produce an ionising secondary particle, such as a charged particle as produce by helium-3 as a result of a n+$^3$He→$^3$H+$^1$H+0.764 MeV reaction. Therefore embodiments of the present invention may also be envisaged which have an enhanced sensitivity to lower energy neutrons, such as thermal neutrons.

Various types of semiconductor material may be used for the semiconductor detector 120. The semiconductor material may be chosen from silicon, diamond or silicon carbide, although it will be realised that embodiments of the invention are not limited to these materials. A particularly preferred material for the semiconductor detector 120 is diamond since a diamond diode may be more sensitive to neutrons having an energy less than 10 MeV due to elastic scattering. Carbon is lighter than silicon, hence a n($^{12}$C, el) is expected to release more energy than a n($^{28}$Si, el) reaction. Using diamond diodes spectral information at such neutron energies is measurable.

FIG. 4 illustrates a system 400 according to an embodiment of the invention. The system includes, by way of example, the detector 100 described above with reference to FIGS. 1-3, although it will be realised that the system may includes detectors according to other embodiments of the invention. The system 400 further includes a control unit 150. The control unit 150 may be implemented as a variety of different types of hardware. In some embodiments, the control unit 150 is a general purpose computer, such as a PC, with appropriate data capture capabilities to receive inputs 141-146 from the detector 100. In other embodiments, the control unit 150 is dedicated hardware, such as a special-purpose embedded processing system. However it will be realised that embodiments of the invention are not limited in this respect.

Each of the semiconductor detector portions 121-126 is arranged to output a corresponding electrical detection signal 141-146 in response to the deposition of energy in the sensitive region of the detector portion 121-126. The detection signals 141-146 are received by the control unit 150. The control unit 150 is arranged to determine one or more of a plurality of channels corresponding to the received detection signals and to allocate the detection signals to the selected channel(s). Detection signals are also allocated to one of a plurality of sub-channels according to an energy of the detection signals, as will be explained.

Embodiments of the invention determine spectral information for the neutron field to which the detector is exposed 100 in part based upon a number of detector portions 121-126 outputting detections signals 141-146 substantially simultaneously i.e. corresponding to a neutron detection event resulting from interaction of a neutron with the detector 100. The detection events are allocated to one of a plurality of a detection channels based upon the number of substantially simultaneous detection signals 141-146 received by the control unit 150.

A first detection channel corresponds to a detection signal being output by one of the plurality of semiconductor detector portions 121-126 of the detector 120. A second detection channel corresponds to a detection signal being output substantially simultaneously by two of the plurality of semiconductor detectors portions 121-126 of the detector 120. A third detection channel corresponds to a detection signal being output substantially simultaneously by three of the plurality of semiconductor detectors portions 121-126 of the detector 120, and so on and so forth. The number of channels is determined by the number of semiconductor detector portions 121-126. The allocation of a detection event to a channel is not restricted by the choice of semiconductor detector portions 121-126 outputting the respective detection signals 141-146 i.e. a detection event of the second channel may arise from any combination of two detectors 121-126 outputting detection signals 141-146, for example.

The control unit 150 allocates the received detection signals 141-146 to the channels in a cumulative or non-cumulative manner. For example, if two detection signals 143, 145 are received substantially simultaneously these are allocated to the second channel, as explained above. If detection signals are allocated cumulatively, they are also allocated to any lower-numbered channels, in this example the first detection channel. If detection signals are allocated non-cumulatively, they are not allocated to any lower-numbered channels, in this example the first detection channel.

The control unit 150 is further arranged to determine one or more sub-channels for each received detection signal 141-146 based on an energy of the detection signal 141-146. The control unit 150 applies one or more thresholds to the received detection signals 141-146 to determine the sub-channels. The one or more thresholds may correspond to energies of 0.1 MeV, 0.2 MeV, 0.3 MeV, 0.5 MeV and 0.7 MeV, although it will be realised that these are merely exemplary. The use of a plurality of energy thresholds for each sub-channel improves an accuracy of neutron spectrum unfolding, as will be explained. The allocation of detection signals 141-146 to respective sub-channels may also be either cumulative or non-cumulative, as explained previously with respect to channel allocation, whereby for cumulative allocation a detection signal is allocated to a sub-channel and any sub-channels having lower energy thresholds, for non-cumulative allocation a detection signal is allocated to a sub-channel but not to any sub-channels having lower energy thresholds.

In order to further explain the allocation of detection events to channels and sub-channels, an example is provided with reference to the table below. Detection signals are received corresponding to substantially simultaneous detection events in detector portions 123, 125 and 126 having respective energies of: 0.14 MeV, 0.31 MeV and 0.52 MeV.

| | Sub-channel threshold energy (MeV) | | | | |
|---|---|---|---|---|---|
| Channel | 0.1 | 0.2 | 0.3 | 0.5 | 0.7 |
| 1 | | | | X | |
| 2 | | X | X | | |
| 3 | X | | | | |
| 4 | | | | | |
| 5 | | | | | |
| 6 | | | | | |

The table above illustrates the non-cumulative allocation of detection events to channels and sub-channels based on the number of substantially simultaneous detection events and an energy of each detection event.

Figure 5:
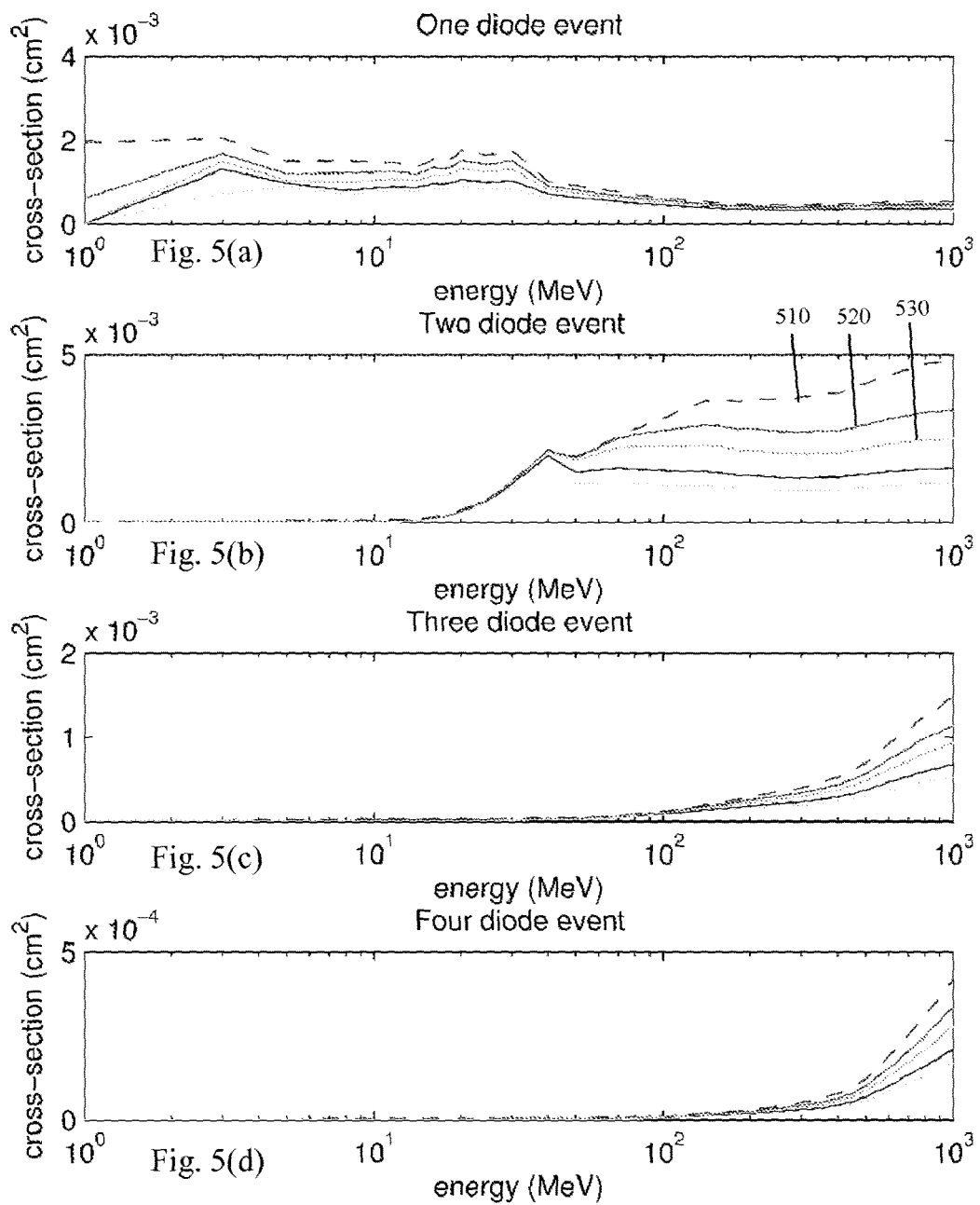
FIG. 5 shows response curves of the neutron detector according to the first embodiment of the invention.

FIG. 5 illustrates response functions of an example embodiment of the detector 100 described above for four channels, although it will be appreciated that the detector 100 has six channels. Within each channel the response functions for five energy thresholds are shown. FIG. 5(a) shows response functions for channel 1, corresponding to a detection signal output by 1 of the detectors 121-126 at thresholds of 0.1 MeV, 0.2 MeV, 0.3 MeV, 0.5 MeV and 0.7 MeV. FIG. 5(b) shows response functions for channel 2, corresponding to detection signals received from two of the detectors 121-126 substantially simultaneously. FIG. 5(c) shows response functions for channel 3 and FIG. 5(d) shows the response functions for channel 4.

From FIG. 5(a) it can be appreciated that the response of the detector 100 in channel 1 is dominated by lower energy neutrons, particularly below 50 MeV. In contrast, the response of the detector 100 in channel 2 (FIG. 5(b)) is dominated by higher energy neutrons, particularly above 50 MeV. The response of the detector 100 in channels 3 and 4 is dominated by increasingly higher energy neutrons (FIG. 5(c), FIG. 5(d)). The response in channels 3 and above results particularly from spallation reactions, such as in the semiconductor detector 120. Three response function curves 510, 520, 530 are indicated in FIG. 5(b). Each response function curve corresponds to a different threshold energy. Other response function curves are not indicated in the Figures with reference numerals for clarity.

In some embodiments of the invention the control unit 150 may be configured to store detection data corresponding to the received input 141-146 in a memory (not shown) for later analysis. For example, the control unit 150 may store data indicative of the detection signals output by the respective detectors 121-126, which may be stored associated with the respective channels of the detection system. However, in some embodiments of the invention the control unit 150 is arranged to unfold the detection data to determine an incident neutron spectrum to which the detector 100 is exposed.

Neutron spectrum unfolding relates to the determination of an energy spectrum of incident neutrons from a plurality of detector outputs. Unfolding of the neutron spectrum may be performed using a range of algorithms, as will be appreciated by those familiar with the art. Some embodiments of the present invention utilise a SPUNIT unfolding algorithm. The algorithm starts with an initial energy spectrum which may be obtained from a library. A flat spectrum may be used as the initial spectrum. An error will exist between the initial spectrum and the actual incident spectrum. An iterative method is performed to minimise the error according to a liner equation:

$$\Phi_k^{i+1} = \Phi_k^i \sum_j^k \frac{R_{jk}}{N_j^i} \left( \sum_j^k \frac{R_{jk}}{N_0^j} \right)^{-1}$$

Where j is an index of the $j^{th}$ channel, M is the number of channels, k is an index of the $k^{th}$ energy interval, R is a response matrix, N is a reading of a channel and Φ is the neutron fluence.

It can be appreciated that the neutron fluence in the next iteration (i+1) is obtained by the neutron fluence in the current iteration (i) multiplied by a factor. Before the next iteration begins, the calculated readings of all channels ($N_j^i$) need to be re-calculated using the fluence updated in the latest iteration where M is the number of energy interval. The algorithm stops when the required error has been reached, or when a specified iteration number has been executed.

Figure 6:
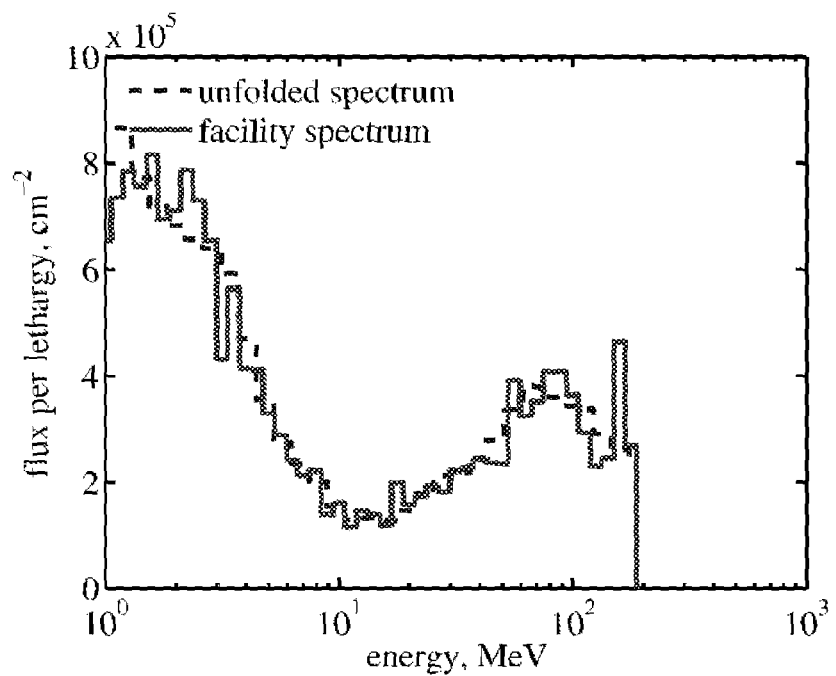
FIG. 6 shows a neutron spectrum unfolded according to an embodiment of the invention.
Figure 7:
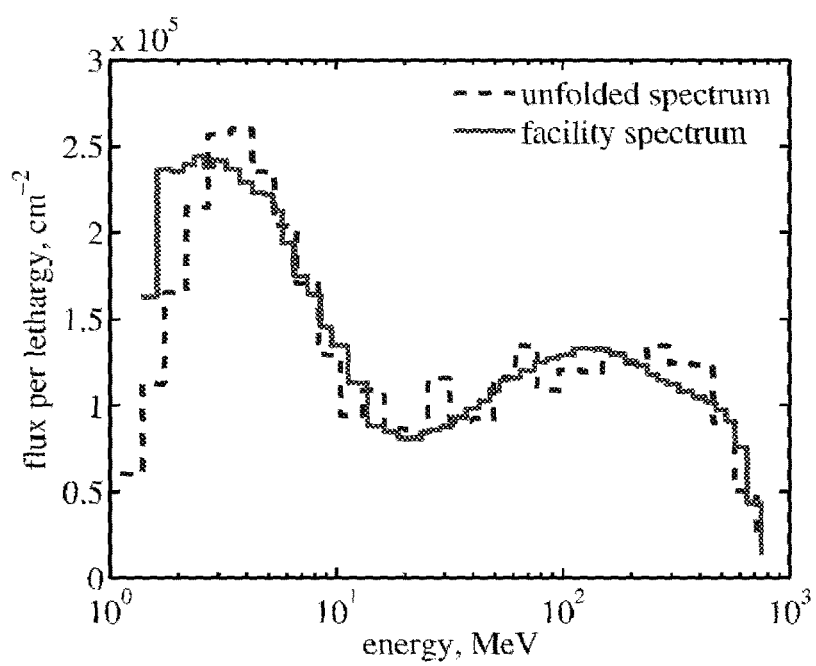
FIG. 7 shows a neutron spectrum unfolded according to an embodiment of the invention.

An input of the unfolding algorithm is the detection data for all channels. An output of the algorithm is an estimated neutron spectrum. Example unfolded flux per lethargies compared with example spectra are illustrated in FIGS. 6 and 7. These example spectra result from simulation in candidate neutron fields used for Single Event Effect (SEE) testing. It can be appreciated from FIGS. 6 and 7 that the estimated unfolded spectra agree closely with the example facility spectra to which the detector is exposed.

Figure 8:
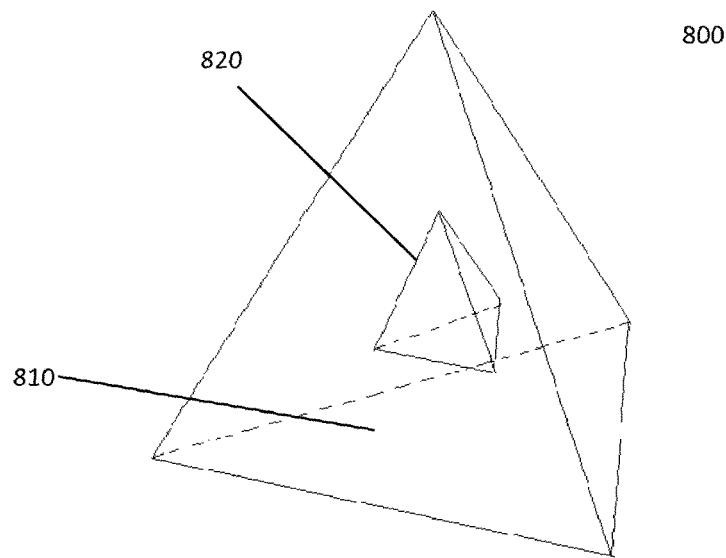
FIG. 8 shows a semiconductor neutron detector according to a second embodiment of the invention.

FIG. 8 shows a neutron detector 800 according to a second embodiment of the invention. The detector 800 comprises a convertor layer 810 and a semiconductor detector 820 as in the first embodiment. However, the semiconductor detector 820 and convertor 810 are tetrahedron-shaped. The semiconductor detector 820 comprises four detector portions, each located on an interior face of the detector 820 around an enclosure volume (not shown). Otherwise, the detector 800 operates as described with respect to the first embodiment.

Embodiments of the present invention provide a detector for detecting incident neutrons and outputting electrical signals corresponding thereto from which a spectrum of the incident neutrons may be determined. Embodiments of the invention also comprise a neutron detection system in which a control unit is arranged to receive signals from a plurality of semiconductor detectors and to allocate the signals to one or more of a plurality of channels. Some embodiments also allocate the detection signals to one or more of a plurality of sub-channels. Based on the channel and possibly sub-channel allocation the spectrum of incident neutrons may be determined. The neutron detection system may utilise a detector as described herein.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A neutron spectrometry system, comprising:
a plurality of semiconductor detector portions arranged in at least two non-parallel axes, wherein each of the plurality of detector portions is configured to output a respective detection signal indicative of energy deposited in the respective detector portion by ionising particles induced in the detector portion by incident neutrons; and
a control unit configured to receive the detection signals from the plurality of detector portions and configured to allocate the received detection signals to one or more of a plurality of channels based on a number of detection signals at least partially temporally coincident for determining a spectrum of incident neutrons based thereon, wherein the control unit is configured to allocate a detection signal output by a single detector portion of the plurality of detector portions having no temporally coincidence with the signals of the other detector portions to a first detection channel, to allocate detection signals output at least partly simultaneously by two detector portions of the plurality of detector portions to a second detector channel, and to allocate detection signals output at least partly simultaneously by three detector portions of the plurality of detector portions to a third detector channel.

2. The system of claim 1, wherein each detector portion is configured to output the respective detection signal responsive to a magnitude of the energy deposited in the respective detector portion by the ionising particles.

3. The system of claim 1, wherein each of the plurality of detector portions comprise one or more semiconductor devices having a sensitive region, wherein the respective detector portion is configured to output the detection signal in response to the ionising particles entering the sensitive region.

4. The system of claim 3, wherein the one or more semiconductor devices comprise diodes.

5. The system of claim 1, wherein the plurality of detector portions are arranged to form an at least partial enclosure volume there-between.

6. The system of claim 5, wherein the at least partial enclosure volume is filled with a gaseous or solid material.

7. The system of claim 5, wherein the plurality of detector portions are arranged to inwardly face the enclosure volume.

8. The system of claim 1, wherein one or more faces of the plurality of detector portions are covered with a convertor material.

9. The system of claim 8, wherein the convertor material is a metal or a hydrogenous material.

10. The system of claim 1, wherein the detection signals are one of non-cumulatively and cumulatively allocated to the channels.

11. The system of claim 1, wherein the control unit is configured to allocate the detection signals to one or more of a plurality of sub-channels based on an energy of each detection signal.

12. The system of claim 11, wherein the control unit is configured to unfold a neutron spectrum based on the detection signals allocated to each channel.

13. The system of claim 12, wherein the control unit is configured to unfold the spectrum of incident neutrons based on the detection signals allocated to each channel and sub-channel.

14. The system of claim 12, wherein the control unit is configured to unfold the neutron spectrum using an iterative process based on an initial neutron spectrum.

15. The system of claim 1, wherein the detector portions are configured to detect a plurality of ionizing particles arising from interaction of a neutron with the spectrometry system.

16. A method of determining a neutron spectrum, comprising:
receiving detection signals from a plurality of semiconductor detector portions in response to neutron-induced ionising particles depositing energy in the semiconductor detector portions, wherein the plurality of semiconductor detector portions are arranged in at least two non-parallel axes;
determining a channel allocation of the detection signals based on a number of at least partially temporally coincident detection signals, wherein a detection signal output by a single detector portion of the plurality of detector portions having no temporally coincidence with the signals of the other detector portions is allocated to a first detection channel, detection signals output at least partly simultaneously by two detector portions of the plurality of detector portions are allocated to a second detector channel, and detection signals output at least partly simultaneously by three detector portions of the plurality of detector portions are allocated to a third detector channel; and
unfolding an energy spectrum of the neutrons based upon the channel allocations.

17. The method of claim 16, wherein the detection signals are one of non-cumulatively and cumulatively allocated to the channels.

18. The method of claim 16, comprising allocating the detection signals to one or more of a plurality of sub-channels based on an energy of each detection signal.

19. The method of claim 16, wherein unfolding the energy spectrum of the neutrons comprises using an iterative process based on an initial neutron spectrum.

* * * * *